2 Sheets Sheet 1.
D. Hammond,
Truss Bridge.
Reissued May 11. 1869.
No. 3433.
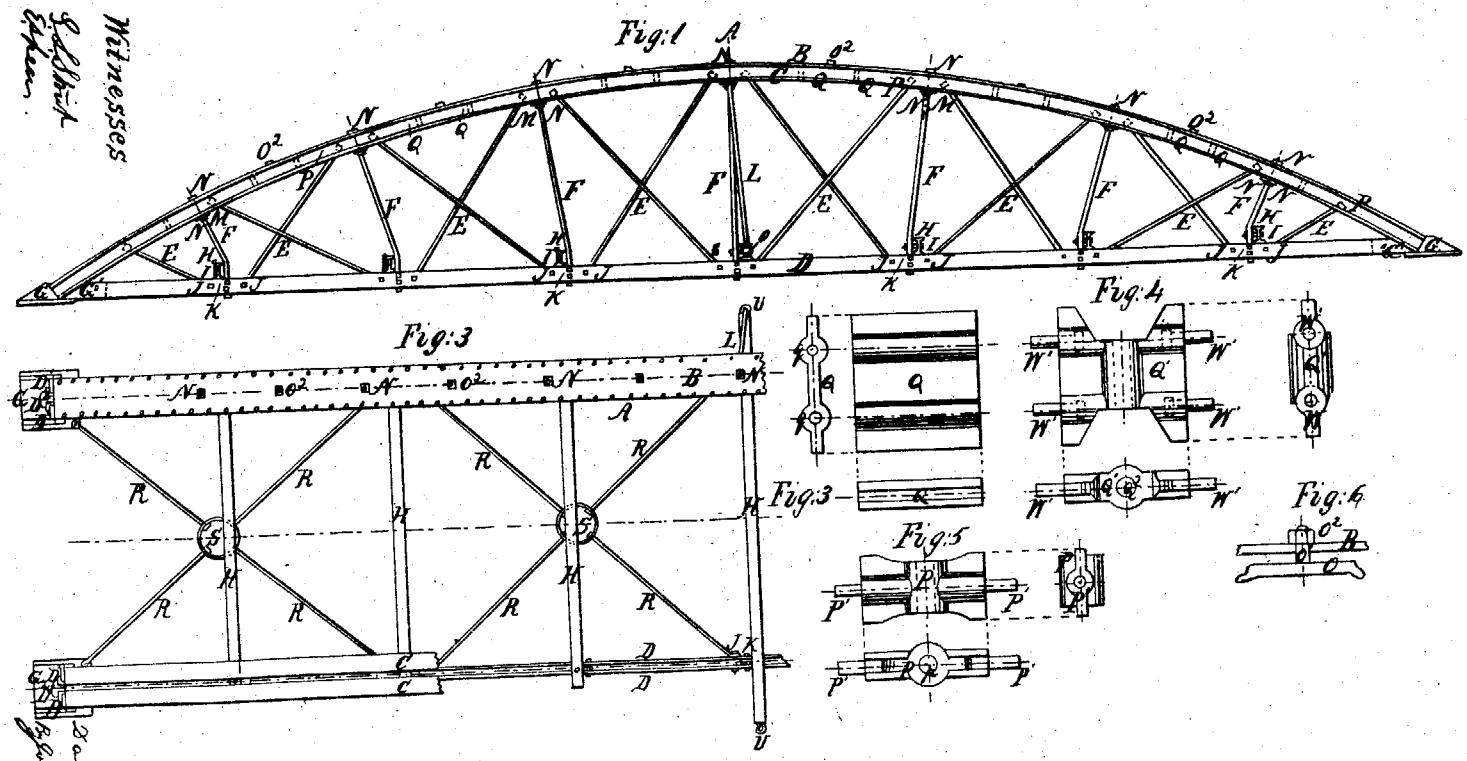
Witnesses
G. S. Strut
E. Spear.
Inventor
David Hammond
By G. O. Abbott, Attorney 2. Sheets. Sheet 2.
D. Hammond,
Truss Bridge.
No. 3,433. Reissued May 11. 1869.
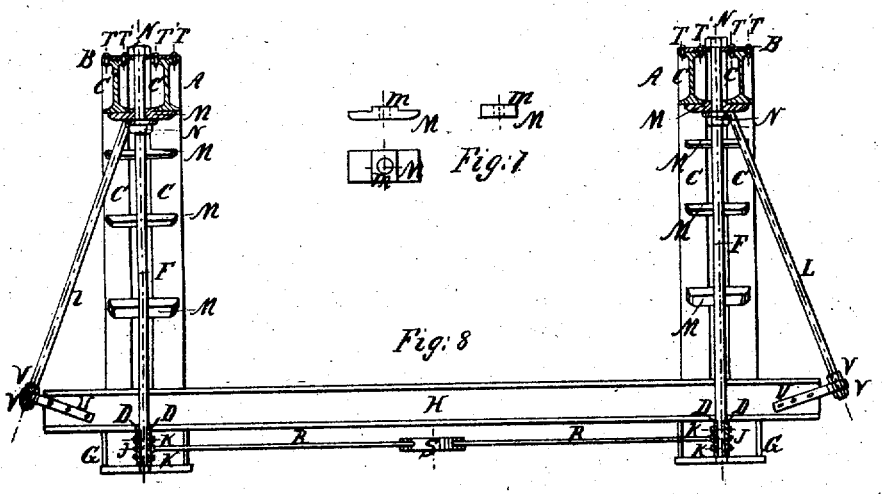
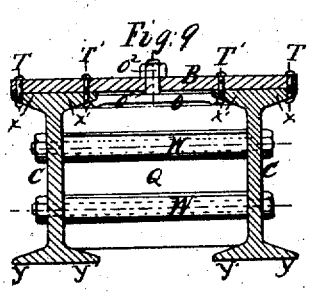
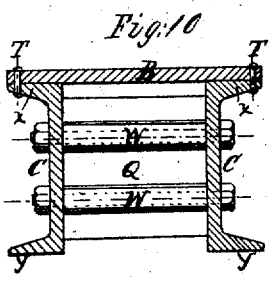
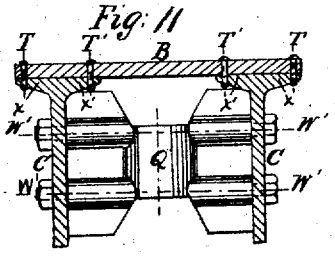
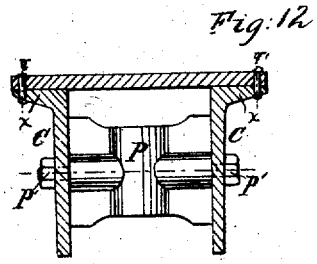
Witnesses
E. Speer
B. S. Stout
Inventor
David Hammond.
By Job Abbott Atty

United States Patent Office.

DAVID HAMMOND, OF CANTON, OHIO.

*Letters Patent No.* 56,043, *dated July* 3, 1866; *reissue No.* 2,586, *dated April* 30, 1867; *reissue No.* 3,433, *dated May* 11, 1869.

IMPROVED BRIDGE.

The Schedule referred to in these Letters Patent and making part of the same.

*To all whom it may concern:*

Be it known that I, DAVID HAMMOND, of Canton, in the county of Stark, and State of Ohio, have invented new and useful Improvements in Wrought-Iron Girders for Bridges and other structures; and I do hereby declare that the following is a full, clear, and exact description of my invention, reference being had to the accompanying drawings, forming a part of this specification, and to the letters of reference marked thereon, of which drawings—

Figure 1 is an elevation of my improved girder, as applied to a bridge.

Figure 2 is a detail half plan of the same.

Figures 3 are detail views of double-bolted clamping-piece.

Figures 4 are detail views of a modified form of double-bolted clamping-piece.

Figures 5 are detail views of single-bolted clamping-piece.

Figure 6 is an elevation of securing-piece.

Figures 7 are detail views of post-clamping piece.

Figure 8 is a cross-section of girders and bridge, as shown in figs. 1 and 2.

Figures 9, 10, 11, and 12, are sectional views, showing the application of the several forms of bolted clamping-pieces to arches constructed of different forms, of iron, in accordance with my improved plan of construction.

It is evident to any one skilled in the art of construction, that any arch will sustain a load equal to its full crushing-strength, if the arch be so constructed and arranged as that it cannot bend, or get "out of line," as it is commonly termed, and that any arch will only sustain a load equal to the limit of elasticity of the arch against bending, when not so held "in line," for as soon as the load exceeds the limit of elasticity in this last case, the arch bends and falls.

It is also evident, that with a good system of vertical trussing in a girder with vertical arch, there is but little danger of the arch, as a whole, springing out of line in a vertical direction, and, consequently, if the breadth of the arch be properly increased, and its parts be so arranged as to prevent any horizontal bending of the arch, either as a whole, or in any of its sections, as well as to prevent any vertical bending of the arch in any of its sections, the arch-girder so constructed will sustain a load equal to the full crushing-strength of the arch in the same.

To accomplish this result in the construction of a wrought-iron arch-girder, which should be of a cheap and durable construction, is the object of my invention, which consists—

First, in the construction of an arch composed of two or more plates of wrought-iron, having at least one flange, rolled on the upper or under edge of each plate, arranged with their principal planes in a vertical position, and parallel to each other, and firmly united to each other by intervening clamping-pieces and clamping-bolts, and a broad wrought-iron covering-piece, with accompanying rivets.

My invention consists, secondly, in the novel construction of the clamping-pieces used for uniting said arch-pieces; and in the novel construction of a securing-piece, used for strengthening the union between said arch-pieces and covering-piece.

My invention consists, thirdly, in the combination of an arch, constructed of rolled, L, channel, T, or double T-iron arch-pieces, intervening clamping-pieces, and clamping-bolts, and a broad covering-piece, with accompanying rivets, with one or more chords, posts, with clamping-pieces, diagonal braces, and arch-shoes, in such a manner as to form a very strong, cheap, and durable bow-string girder, which is especially adapted to the construction of common road-bridges.

To enable others skilled in the art to make and use my invention, I will proceed to describe more fully its construction.

The arch A of my girder is composed of three principal pieces, the arch-pieces C C, and the covering-piece B.

These arch-pieces are composed essentially of a wrought-iron web, C, curved edgewise to the required curvature of the arch, and provided with at least one flange, *x*, which is rolled on to or with the web C, while the same is being rolled.

A second edge flange, *x*, may be rolled on the web C, opposite the flange *x*, and the lower flanges *y y'* may be rolled on the other edges of the web C, or two flanges *x y*, can be rolled on the opposite edges and same side of the web C, from which it is readily seen that the arch-pieces may be made of either L, T, channel, or double T-iron, as it is commonly called, as shown in figs. 9 to 12, the essential requisites to the proper construction being, first, a web, to give the arch-pieces vertical stiffness; and, second, one or more flanges, by which the covering-piece may be firmly riveted to the arch-pieces, but it is evident that the double T-iron is the preferable form, as it affords the best distribution of material to resist vertical or lateral bending of the arch, and allows of the perfect riveting of the covering-piece to the arch-pieces.

The arch-pieces C C are set up parallel to each other, and are clamped together by means of the clamping-pieces Q, or Q', or P, and their accompanying bolts, as shown in figs. 9 to 12.

These clamping-pieces are of cast-iron, and are of a peculiar construction, and may be made either as single or double-bolted clamping-pieces.

The clamping-piece Q, shown in figs. 3, is made of a shape corresponding to the space between the arch-pieces C C, and has the holes $q$ $q$ formed in it, through which pass the clamping-bolts W W, as shown in fig. 9.

Where it is desired to use the clamping-piece as a point of attachment for the truss-posts of the girder, the clamping-bolts W′ W′ are cast in the clamping-piece $Q^1$, and a hole, $Q^2$, is formed through the piece $Q^1$, as shown in figs. 4.

The single-bolted clamping-piece P has the clamping-bolts P′ P′ cast in it, and has a hole, $p$, formed in it, as shown in figs. 5, and is designed to be used as a point of attachment for the diagonal truss-braces to the arch; the single bolts P′, at each side, allowing of a rotation of the piece P, so as to bring the hole $p$ in line with the braces.

The clamping-piece Q may be made single-bolted, if desired, by forming a single hole, $q$, at the centre of the piece, in a manner readily seen.

The covering-piece B is placed on the arch-pieces C C, as shown, and is firmly united to said pieces, either by one or more rows of rivets T T′, which pass through the covering-piece B, and the flanges $x$ $x'$, as shown, or by means of the securing-pieces O, of the form shown in fig. 6, which fit up under the flanges $x'$ $x'$, and have a bolt $O^1$, which passes through the covering-piece B, and is secured by a nut $O^2$, as shown in fig. 9, the use of the rivets being desirable in all cases, as it insures a most perfect unity of action between the arch and covering-pieces, and the securing-pieces being used, when desired, in connection with arch-pieces, having inner flanges $x'$ $x'$.

The arch A abuts against suitably-formed faces on the arch-shoes G G, which rest on the piers or abutments on which the girder is placed.

The chords D D, which unite the ends of the arch A, are made of plate-iron, and are arranged as shown, their ends being secured in the shoes G G, by the heads $D^1$ $D^1$, formed at their ends, which bear on faces in said shoes, and which are held apart and strengthened by means of the headed block $D^2$, which is placed between the chords D D, and is fastened to said chords by a bolt or bolts, G′, as seen in figs. 1 and 2.

The truss-posts F F have notches formed in their sides, at their lower ends, in which are secured the chords D D, by means of one or more bolts, K, which pass through the chords D D, and post F, as shown in figs. 1, 2, and 8.

The upper ends of these truss-posts are secured to the arch A, either by passing them through the hole $Q^2$, in a clamping-piece $Q^1$, and securing them by a jam-nut on the post F, below the clamping-piece, and another nut on the post above the clamping-piece, or above the covering-piece B, through which the post F may be extended; or a post-clamping piece, M, (provided with a projection, $m$, which fits between the lower edges of the web C, of the arch-pieces, or between the flanges $y'$ $y'$, on said arch-pieces when these flanges are used,) may be used with the post F, the said piece having a hole through which the post passes, and fitting against the arch-pieces C C, and the post-clamping piece and arch being firmly united by jam-nuts, N N, on the post F, one below the clamping-piece M, and the other above the covering-piece B, through which the post F is passed, as shown in fig. 8.

The last-described mode of attaching the truss-posts and arch is the preferable one, as it makes the strongest and most inflexible fastening for the truss-post.

The diagonal braces E E have eyes turned at their lower ends, which are placed between the chords D D, where they are secured by bolts J, which pass through the chords and the eyes on the braces.

The upper ends of these braces are secured to the arch A, by passing them through the hole $p$ in the clamping-piece P, and securing them by a nut on the brace at the upper side of said clamping-piece, or the ends of the braces may be passed through the covering-piece B, and secured by a nut and oblique washer on the top of the covering-piece B, in a manner readily seen, either method affording a sufficiently strong connection.

When my girder is applied to the construction of a bridge, as shown in figs. 1, 2, and 8, the floor-beams H H are laid on the chords D D, as shown, where they are secured either by bolts I I, which pass through the webs of the floor-beams, and holes in the posts F F, or by bolts I I, which pass through the flanges of the floor-beam and between the chords D D, and are secured below said chords by a nut or a cross-bar and nut, in a manner readily seen.

The centre floor-beam H, and one or more of the side-beams, if desired, are prolonged beyond the chords D D, and have the strap-eyes U U secured to them, as shown.

In these eyes are secured the ends of the braces L L by means of jam-nuts, V V, on said braces, and an eye is formed on the upper end of said brace, which fits over the post F, and between the post-clamp M and jam-nut N, by which means the girders are firmly braced in an erect position, as well as being held against lateral bending.

The whole bridge is firmly braced against lateral movement, by the lateral braces R R, which are secured by eyes at their ends, and the bolt J to the chords D D, and which unite in rings, S, where they are adjusted by nuts, as shown in figs. 2 and 8.

It is readily seen that hollow thimbles, of a length equal to the distance between the webs of the arch-pieces, might be used in place of the clamping-piece Q, but that they would not have as good an action against any twisting of the arch; also that the arch could be constructed without a covering-piece, or without the intervening clamping-pieces, but that either of these last methods of construction would be very imperfect, as the first would allow the rain and moisture to gather in the arch, and rust the same, while either plan would give but little unity of action in the arch-pieces against bending.

The width to be given to the arch A will depend upon the span of the arch to some extent, but is usually from one to one and one-half time the height of the arch-pieces C C.

Having thus fully described my invention,

What I claim therein as new, and desire to secure by Letters Patent, is—

1. The arch A, composed of the wrought-iron arch-pieces C C, having one or more flanges $x$ $y$, rolled thereon, and united by intervening clamping-pieces and clamping-bolts and the covering-piece B, the several parts being connected and combined substantially as and for the purpose specified.

2. The combination of two or more wrought-iron arch-pieces C C, having one or more flanges $x$ $y$ rolled thereon, when said arch-pieces are united by intervening clamping-pieces and bolts, constructed as herein specified, and are used in the construction of a wrought-iron arch-girder, substantially as is herein specified.

3. The clamping-piece Q, herein described, whether the same be made as a single or as a double-bolted clamping-piece, when constructed and used substantially as and for the purpose specified.

4. The post or brace-clamping pieces herein described, whether the same be made as double-bolted clamping-pieces, as shown in fig. 4, or as single-bolted clamping-pieces, as shown in fig. 5, when used substantially as and for the purpose specified.

5. The securing-piece O, provided with bolt $O^1$ and nut $O^2$, when constructed and used substantially as and for the purpose herein specified.

6. The combination of the arch-pieces C C, covering-piece B, truss-post F, with jam-nuts N N, and post-clamp M, with raised portion *m*, the several parts being arranged substantially as and for the purpose specified.

7. The combination of the arch A, constructed as specified in first claim, the chords D D, arch-shoes G G, truss-posts F F, and diagonal braces E E, the whol forming a wrought-iron girder, substantially as and for the purpose specified.

As evidence that I claim the foregoing, I have hereunto set my hand, this day of , in the presence of two witnesses.

DAVID HAMMOND.

Witnesses:
ED. A. BEEBOUT,
JOB ABBOTT.